United States Patent [19]

Criner et al.

[11] Patent Number: 4,655,293
[45] Date of Patent: Apr. 7, 1987

[54] LIGHT WEIGHT, HIGH STRENGTH REINFORCED METAL HORSESHOE

[75] Inventors: Charles B. Criner, Taylors; Jerry A. Winnett, Pendleton, both of S.C.

[73] Assignee: Atlantic Richfield Company, Los Angeles, Calif.

[21] Appl. No.: 771,955

[22] Filed: Sep. 3, 1985

[51] Int. Cl.$^4$ .............................................. A01L 1/02
[52] U.S. Cl. ...................................................... 168/4
[58] Field of Search .................. 168/4, 24, 29, DIG. 1

[56] References Cited

U.S. PATENT DOCUMENTS

| 3,425,493 | 2/1969 | Kulak | 168/4 |
| 3,628,608 | 12/1971 | Sherman | 168/4 |
| 4,480,698 | 11/1984 | Reeves | 168/4 |

FOREIGN PATENT DOCUMENTS

| 2308228 | 10/1974 | Fed. Rep. of Germany | 168/4 |
| 113862 | 9/1980 | Japan | 168/4 |
| 533916 | 2/1941 | United Kingdom | 168/4 |

Primary Examiner—Robert P. Swiatek
Attorney, Agent, or Firm—Craig F. Larson

[57] ABSTRACT

A light weight horseshoe is described which is composed of aluminum or an aluminum alloy reinforced by ceramic whiskers, particles or fibers, preferably silicon carbide whiskers. The whisker content is in the range of 1–40 volume percent. The shoes exhibit the wear and strength characteristics of prior art iron and steel shoes, with none of the undue decrease in wear and strength common to prior art light weight horseshoes.

4 Claims, No Drawings

LIGHT WEIGHT, HIGH STRENGTH REINFORCED METAL HORSESHOE

FIELD OF THE INVENTION

The invention herein relates to horseshoes.

BACKGROUND OF THE INVENTION

Conventional horseshoes have a long and often romantic history, conjuring up images of the "village blacksmith." For most of that history, the blacksmith has been an integral part of the horseshoe fabrication process, forging first iron and later steel bar into horseshoes. Such iron or steel shoes are quite heavy, making them inappropriate for use in many situations. For instance, lighter weight shoes should be used for young horses whose legs are not yet strong enough for conventional shoes. Light weight shoes are often used in horse racing. They may also be useful where a horse has injured its leg and should not wear the heavier shoes while the leg heals.

In the past light weight shoes have usually been formed by making a shoe out of a light metal, usually aluminum with steel inserts or calks placed at the points of expected wear. Such shoes, however, have been found to have both poor wear and poor strength characteristics. Generally, use of light weight metals without inserts in horseshoes has been found to produce the same type of problems: rapid wear and severely reduced strength when compared to the standard steel or iron horseshoes.

Modern practice of farriery recognizes that there are many applications which require light weight horseshoes in preference to the conventional iron or steel shoes. However, the light weight shoes should provide wear and strength properties comparable to the heavier conventional shoes. Consequently, it would be desirable to have a light weight horseshoe which has wear and strength characteristics equivalent to heavier conventional shoes.

SUMMARY OF THE INVENTION

The invention herein is a horseshoe comprising aluminum or an alloy thereof having distributed therethrough 1 to 40 volume percent of reinforcing ceramic whiskers, particles or fibers.

In a preferred embodiment the ceramic reinforcement is silicon carbide whiskers.

In a further preferred embodiment the whisker content of the composite horseshoe will be on the order of 30 volume percent. (All percentages herein are volume percentages unless otherwise stated.)

DETAILED DESCRIPTION OF THE INVENTION

The aluminum used for the horseshoes of the present invention may be aluminum itself or any of the aluminum alloys which can be treated in various ways such as heat hardening to provide a tough, wear resistant, hard alloy. Particularly useful horseshoes may be made using alloys 2124, 6061 or 7090, which have the following compositions:

| Element | 2124 | 6061 | 7090 |
|---|---|---|---|
| Silicon | 0.20% | 0.4–0.8% | 0.12% |
| Iron | 0.30 | 0.7% | 0.15% |
| Copper | 3.8–4.9% | 0.15–0.4% | 0.6–1.3% |
| Manganese | 0.3–0.9% | 0.15% | — |
| Magnesium | 1.2–1.8% | 0.8–1.2% | 2.0–3.0% |
| Chronium | 0.10% | 0.04–0.35% | — |
| Zinc | 0.25% | 0.25% | 7.3–8.7% |
| Titanium | 0.15% | 0.15% | — |
| Other elements | 0.15% | 0.15% | 0.15% |
| Aluminum | Balance | Balance | Balance |

Typical alloys and the heat treating processes which may be used to harden them are described in the *Source Book on Selection and Fabrication of Aluminum Alloys*, published by the American Society of Metals (1978).

The reinforcing material is preferably silicon carbide whiskers. Both the alpha and beta forms of silicon carbide whiskers are available commercially. A particularly preferred commercial source is those silicon carbide whiskers produced and marketed by the Advanced Materials Group of ARCO Chemicals Company. Such fibers have average diameters on the order of 0.6 μm and aspect ratios on the order of 15 to 150. Strengths are typically on the order of 1 million psi (70,000 kg/cm) and tensile moduli on the order of 60 to 100 million psi (4–7 million kg/cm$^2$). The silicon carbide whiskers are stable to 3200° F. (1760° C.). Other reinforcing materials which may be suitable will include whiskers, particles or fibers of alumina, aluminum nitride, beryllia, boron carbide, graphite, titanium diboride, titanium carbide and silicon nitride. Mixtures of these reinforcing materials may also be used.

The ceramic materials are dispersed throughout the metal matrix by blending them with metal powder. A solid high strength billet is then formed by vacuum hot pressing or by casting the ceramic reinforcement in the metal. The resulting billets will be essentially at their theoretical density, free of porosity and are homogeneous. The billets are thereafter extruded or drawn to produce the rods from which the shoes are formed. The flow lines in the metal matrix resulting from these operations enhance the workability of the rods and permit the formation of the tough, wear resistant shoes. The reinforcement content may be in the range of from 1 to 40 volume precent.

A commercial material which has been found to be quite suitable for fabrication into the horseshoes of this invention is a silicon carbide whisker reinforced aluminum alloy sold under the trademark "SXA" by the aforesaid Advanced Materials Group of ARCO Chemical Company.

The horseshoes of the present invention may be formed by a standard foregoing operation in which an extruded rod of the reinforced aluminum is curved into a typical horseshoe shape and then pressed or forged into the desired horseshoe shape. The desired grooves, nail holes, projections and the like common to horseshoes may be impressed at this time. The composite rods used may also be readily formed into shapes for horseshoes for special purposes. Then they may be in the common "horseshoe" shape, as well as being formed for round toe shoes, square toe shoes, half-round shoes, plates, shoes with trailers and shoes with weighted toes. Other shapes may also readily be formed.

Horseshoes of this invention have been formed as described above from the aforementioned "SXA" material containing 30 volume percent silicon carbide fibers in 6061 aluminum alloy. For maximum hardness, strength and wear resistance these alloys can be heat treated to a temper rating of T6 by solution heat treating and then artificial or natural aging. The shoes were approximately one-third the weight of conventional steel shoes. The shoes were fitted to an Egyptian-Arabian quarter horse and were worn for a period of greater than four months. The amount of wear observed was less than or equal to the wear of conventional steel shoes and was significantly less than would have been expected with prior art aluminum shoes. In addition, there was no significant corrosion product on these shoes, as compared to rust which would tend to form on steel shoes. During this period the shoes were adjusted once to compensate for the growth of the horse's hooves. It is also believed that the improved resiliency of these composite shoes will be reflected in comfort and well-being of the horse.

It will be evident from the description above that there are numerous embodiments of this invention which are not specifically described but which are clearly within the scope and spirit of the present invention. The scope of the invention is therefore to be limited solely by the appended claims.

We claim:

1. A horseshoe comprising aluminum or an alloy thereof having distributed therethrough about 1–40 volume percent of reinforcing ceramic material comprising silicon carbide whiskers.

2. A horseshoe as in claim 1 wherein the alloy of aluminum is selected from the group consisting of 2124, 6061 or 7090 alloys.

3. A horseshoe as in claim 2 wherein the reinforcing material content is about 30 volume percent.

4. A horseshoe as in claim 1 formed by forging an extruded or drawn rod of said aluminum or alloy thereof reinforced with said ceramic material.

* * * * *